APPARATUS FOR AUTOMATIC GAIN CONTROL

Filed Aug. 28, 1956

4 Sheets-Sheet 1

INVENTOR.
LOUIS A. ULE
BY [signature]
ATTORNEY

INVENTOR.
LOUIS A. ULE
BY
[signature]
ATTORNEY

March 7, 1961 L. A. ULE 2,974,224

APPARATUS FOR AUTOMATIC GAIN CONTROL

Filed Aug. 28, 1956 4 Sheets-Sheet 3

INVENTOR.
LOUIS A. ULE

BY [signature]

ATTORNEY

INVENTOR.
LOUIS A. ULE
BY
Edward J. Kendrick
ATTORNEY 2,974,224

APPARATUS FOR AUTOMATIC GAIN CONTROL

Louis A. Ule, Alhambra, Calif., assignor to Gilfillan Bros., Inc., Los Angeles, Calif., a corporation of California Filed Aug. 28, 1956, Ser. No. 607,539
8 Claims. (Cl. 250—20)

This invention relates to a method of and means for stabilizing the gain of a radiant energy receiving system, and more particularly to a method of and means for effecting a pilot signal control gain.

In the past, use has been made of an independently produced pilot signal for a more sensitive gain control. For example, it is currently the practice to mix a pilot signal with an input signal in a mixer, pass the output of the mixer through a receiving system, filter the pilot signal out of the composite output of the system, amplify the pilot signal, detect it, and control the gain of the system inversely with the output signal amplitude to the pilot signal by applying the output of the pilot signal detector to a gain control amplifier in the system.

Use of this system provides unusually sensitive gain control because the input pilot signal amplitude can be controlled within narrow limits so that its output level becomes an accurate measure of the gain of the system. However, to the present time it has been necessary to employ a pilot signal rejection filter at the output of the system. This, in turn, introduces phase shift and amplitude distortion to the output signal of the system, and particularly to signals the frequencies of which lie close to that of the pilot signal. Thus, the use of a pilot signal rejection filter has meant pilot signal suppression at the output of the system, but only at the expense of introducing further problems.

The present invention overcomes these and other disadvantages of the prior art by providing a method of automatically controlling the gain of an input signal having accompanying noise which may be impressed upon a radiant energy receiver. The method includes the steps of mixing a pilot signal with the input signal to the receiver at a power level below that of the noise, and controlling the gain of the receiver substantially inversely with the amplitude of the pilot signal at the output of the receiver. By introducing the pilot signal to the system at a power level below that of noise, it has been possible to eliminate the pilot signal rejection filter at the output of the system and its inherent disadvantages. This for the reason that the addition of a single frequency low amplitude pilot signal to the noise originally existing at the input of the system will not noticeably increase the noise level.

Suitable apparatus for performing the method in the system including a mixer and a variable gain network connected from the mixer for receiving an input signal may include means for introducing a pilot signal to the mixer to be mixed with the input signal, for example at a power level below that of noise, a filter connected from the variable gain network to pass substantially only the frequency of the pilot signal, and a detector responsive to the output of the filter for varying the gain of the variable gain network substantially inversely with the output signal amplitude of the filter.

According to a feature of the invention, a method of automatically equalizing the gains between a plurality of channels in a system for receiving a plurality of corresponding input signals is provided including the steps of mixing a pilot signal with each of the input signals, developing a plurality of difference signals by subtracting the output pilot signal of each of the channels from corresponding signals having gains within the range of all the channels, and controlling the gain of each of the channels substantially inversely with the amplitude of each corresponding difference signal.

In one embodiment of the apparatus of the invention, the latter method is performed by means for introducing a pilot signal to a mixer which may be provided in each of the channels, means at the output of each channel for filtering out the pilot signal in each channel, means for subtracting the output pilot signal of each of the channels from a signal having a gain within the range of all the channels, and means for controlling the gain of each of the channels or the variable gain network in each with the amplitude of each corresponding difference signal.

In accordance with one aspect of the invention, the pilot signal input level is automatically controlled inversely with the average of the output pilot signal amplitude of all the channels.

The invention also contemplates the use of manually adjustable means to control the gains of each of the channels simultaneously. In this case, automatic gain control for each of the channels is preferably superimposed on the gain control provided by the manually adjustable means.

According to another aspect of the invention, means are provided to subtract the output pilot signal of a subsequent channel from a previous channel except for a channel which may be called the last channel. In this case, the pilot output signal of the first channel is subtracted from the last channel. Error or gain control signals are thus derived based on the average of all the pilot signal amplitudes.

Special means are provided for developing the difference signals described in the preceding paragraph. This means preferably includes a transformer for each of the channels having first and second primary leads, the first primary lead of each being connected directly from means to pass the pilot output signal. Each second lead of the primary of all the transformers except the last are then connected to the first primary lead of a succeeding transformer. The second primary lead of the last transformer is connected to the first primary lead of the first transformer. The secondaries of each of the transformers are then connected to phase detectors to produce error control or gain control signals which are detected and applied to the variable gain networks in each of the channels. A standard pilot signal frequency having a substantially constant amplitude is also fed to each of the phase detectors to produce an output signal the amplitude and sign of which are representative of the gain correction which should be made in each corresponding channel.

It is therefore an object of the invention to provide a method of and an apparatus for precisely controlling the gain of a radiant energy receiving system without introducing distortion of an input signal.

It is another object of the invention to provide a method of and apparatus for equalizing the gains between a plurality of channels in a system for receiving a plurality of corresponding input signals.

Still another object of the invention is to provide apparatus for changing the gain of a plurality of channels in a radiant energy receiving system by an amount to stabilize the gain of each at a value substantially equal to the average of their unbalanced gains.

A further object of the invention is to provide pilot signal automatic gain control means for making automatic gain control means for each of a plurality of radiant energy receiving channels substantially independent of the average gain of all the channels.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

Figure 1:
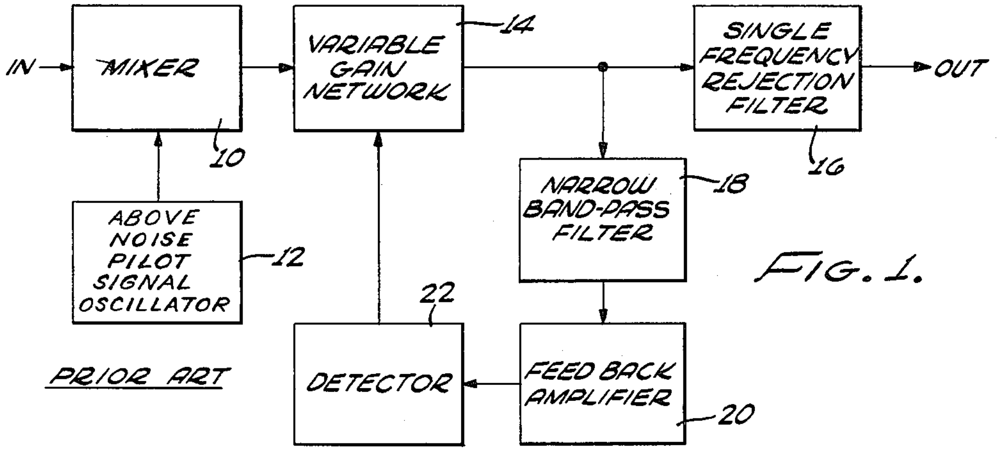
Fig. 1 is a diagrammatic view of a pilot signal automatic gain control system employed in the prior art.

In the drawings in Fig. 1 an input is shown to a mixer 10 having a second input from an above-noise pilot signal oscillator 12. The output of the mixer 10 is impressed upon a variable gain network 14, the output of which is in turn impressed upon a single frequency rejection filter 16 and narrow bandpass filter 18. The output of the narrow bandpass filter 18 is passed through a feedback amplifier 20 and a detector 22, the output of which is impressed upon the variable gain network 14 to control the gain thereof.

In the operation of the system shown in Fig. 1, the above-noise pilot signal oscillator 12 is employed to produce a pilot signal having an amplitude above the noise level of input signals introduced to the mixer 10 at, for example, the lead 24. The oscillator 12 may be any conventional oscillator. The output of the oscillator 12 is then mixed with the input signal in mixer 10 and passed through variable gain network 14 and filters 16 and 18. Single frequency rejection filter 16 is employed to suppress the pilot signal at the output of the system. Narrow bandpass filter 18 is employed to pass only the pilot signal output of the variable gain network 14. This pilot signal is amplified by amplifier 20 and detected by detector 22, the output of which is employed to change the gain of variable gain network 14 substantially inversely with the pilot output signal amplitude of the variable gain network 14. As stated previously, this system provides a sensitive control of gain because the input pilot, i.e. from the pilot signal oscillator 12 to the mixer 10, may be controlled within narorw limits. However, the use of single frequency rejection filter 16 shifts the phase of harmonics of the input frequency appearing at the output of variable gain network 14, particularly those modulation frequencies near the frequency of the pilot signal. In addition, harmonics of the input signal or modulation frequencies near that of the pilot signal are distorted in amplitude.

Figure 2:
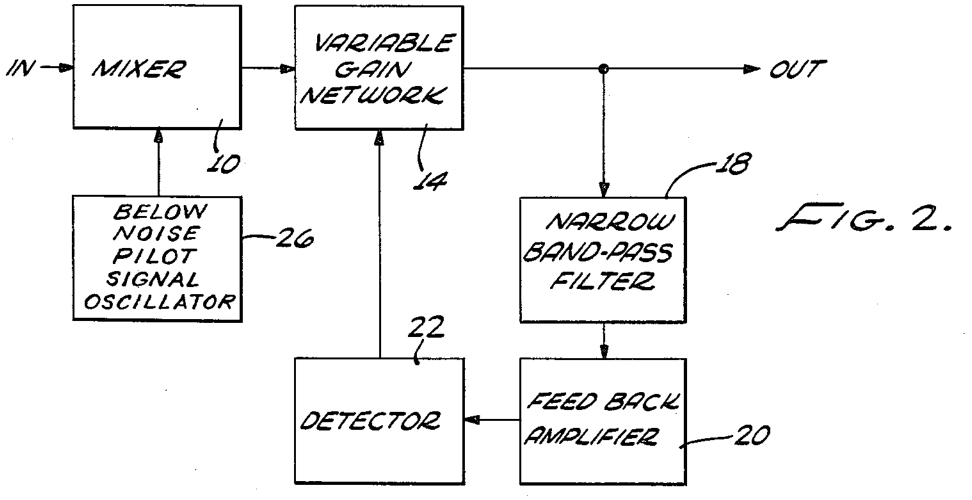
Fig. 2 is a diagrammatic view of the pilot signal automatic gain control system of the present invention.

The present invention overcomes this disadvantage with the system shown in Fig. 2 which employs the same mixer 10 and variable gain network 14. Single frequency rejection filter 16 is noticeably absent. Narrow bandpass filter 18, feedback amplifier 20 and detector 22 may be employed as before. A different or below-noise pilot signal oscillator 26 is employed in the embodiment of the invention shown in Fig. 2 to produce an output pilot signal having amplitude less than the noise level accompanying the input signal to the mixer 10. The below-noise pilot signal oscillator 26 may in fact be identical to the above-noise pilot signal oscillator 12, except for the output pilot signal level which it is constructed to produce.

In the operation of the embodiment of the invention shown in Fig. 2, the input signal and its accompanying noise is mixed in mixer 10 with the pilot signal output of oscillator 26. The output of mixer 10 is impressed upon variable gain network 14 as before and narrow bandpass filter 18 filters out the pilot signal of the variable gain network 14 both from the input signal and from its accompanying noise. This is fed back to the variable gain network 14 through feedback amplifier 20 and detector 22 to control the gain thereof. Elimination of the single frequency rejection filter 16 is facilitated by the use of oscillator 26 to introduce a pilot signal at a level below that of the input noise to the mixer 10. Since the pilot signal is a single frequency signal having a power less than the average noise power input to the mixer 10, it does not noticeably disturb the output of variable gain network 14 which may be utilized without the single frequency rejection filter 16.

Figure 3:
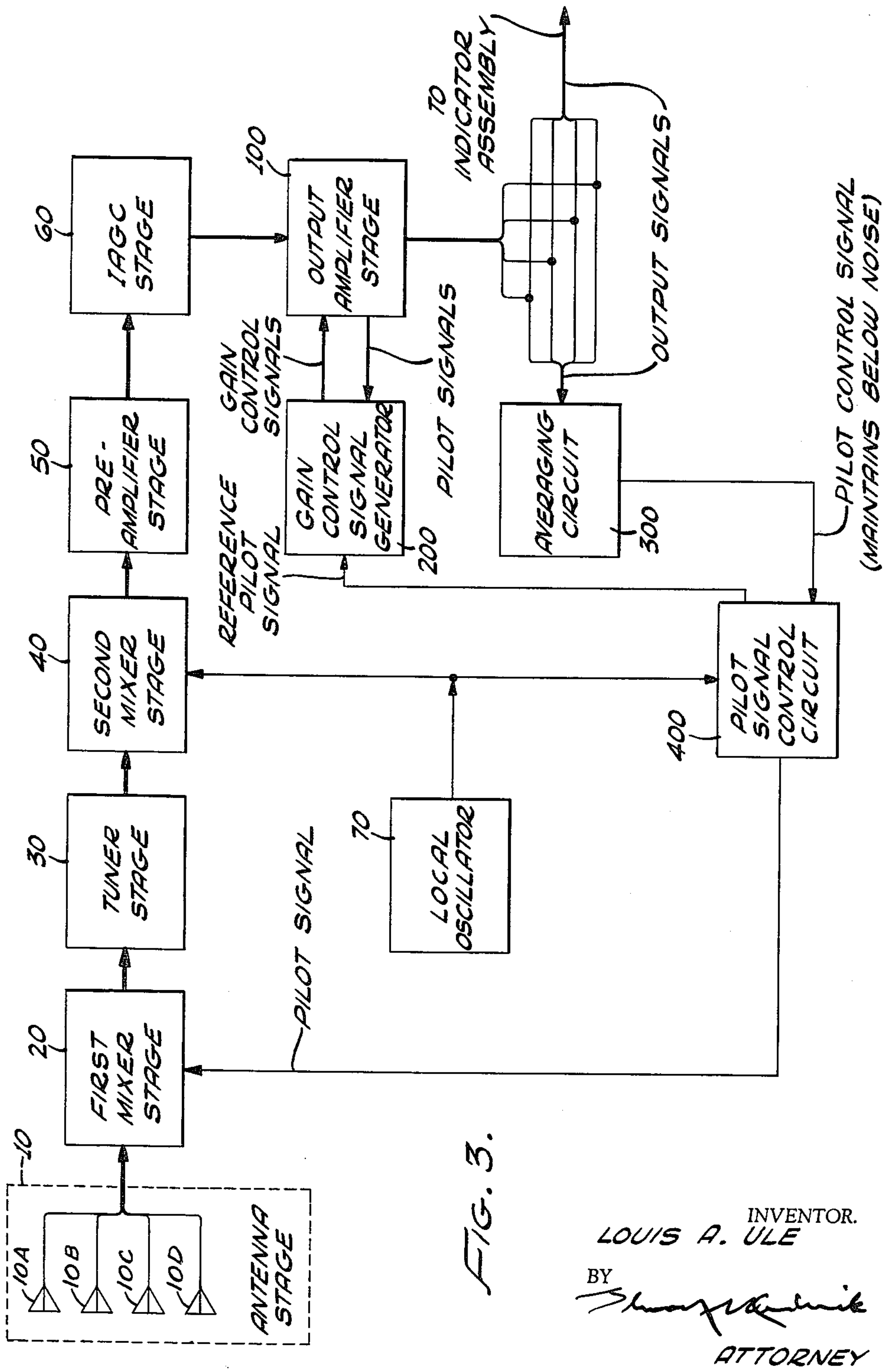
Fig. 3 is a block diagram of a plural channel direction finding receiver system employing the gain control in accordance with another embodiment of the invention.

Another embodiment of the invention is shown in Fig. 3. This embodiment includes a plural channel direction finding receiver system which may include four channels which are divided up into several stages. The channels may be called A, B, C and D. The system is divided into several stages. An antenna stage 10 is connected to the mixer stage 20 which is, in turn, connected to successive tuner, second mixer, preamplifier, and instantaneous automatic gain control stages 30, 40, 50 and 60, respectively. The output of instantaneous automatic gain control stage 60 is impressed upon an output amplifier stage 100, which impresses filtered pilot signals on a gain control signal generator 200, which in turn in response to a reference pilot signal from a pilot signal control circuit 400 impresses gain control signals on the output amplifier stage 100. The output of amplifier stage 100 is also impressed upon an averaging circuit 300 which provides a pilot control signal, which is a direct-current voltage having an amplitude proportional to the average of the amplitudes of the output pilot signals, to control a pilot signal to the first mixer stage 20 from pilot signal control circuit 400. A local oscillator 70 is also provided to impress the same output signal on second mixer stage 40 and pilot signal control circuit 400.

Antenna stage 10 comprises antennas for each of the four channels 10A, 10B, 10C and 10D. As stated previously, each of the stages 10 through 60 have four channels. This means that the pilot signal output of pilot signal control circuit 400 is impressed upon each channel in the first mixer stage 20. Likewise the output of local oscillator 70 is impressed upon each of the four stages in second mixer stage 40.

In order to better understand the operation of the invention with the several stages plural channels of the receiver system shown in Fig. 3, it will be desirable to explain in detail the character and functions of the output amplifier stage 100, gain control signal generator 200, averaging circuit 300 and pilot signal control circuit 400.

Figure 4:
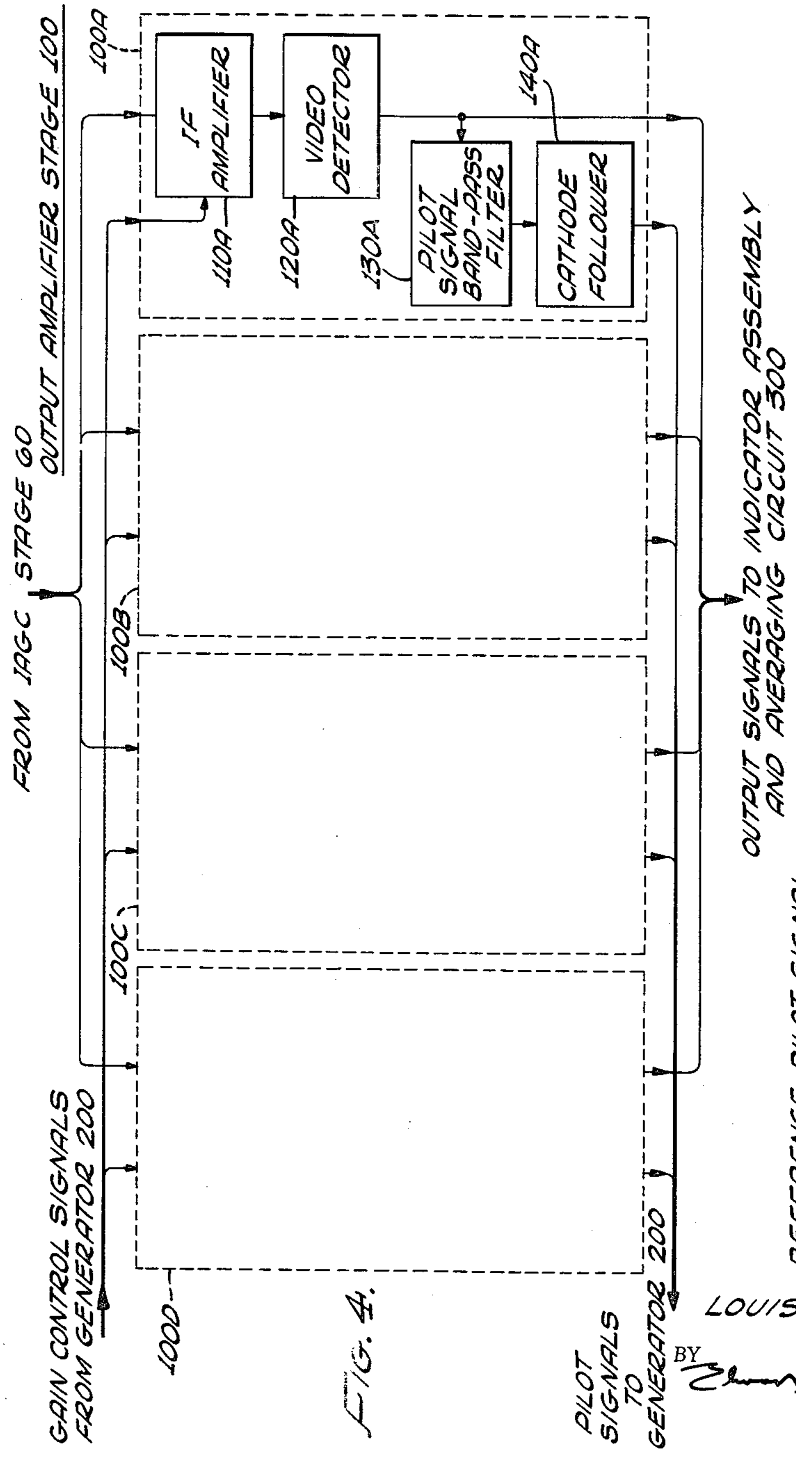
Figs. 4 and 5 are diagrammatic views of blocks shown in Fig. 3.

Output amplifier stage 100 is shown in Fig. 4 having four channels 100A, 100B, 100C and 100D, which may be substantially identical.

To eliminate repetition of the description of each of the channels in the output amplifier stage 100, channel 100A will be the only one specifically shown and described. Channel 100A comprises an input IF amplifier 110A, a video detector 120A connected therefrom, and a pilot signal bandpass filter 130A and cathode follower 140A connected in turn from the video detector 120A.

Inputs to the IF amplifiers 110 in each of the channels 100 are provided from the instantaneous automatic gain control stage 60 shown only in Fig. 3. The gain of the IF amplifiers 110 are controlled respectively by four output leads from gain control signal generator 200 which are impressed respectively on each of the channels 100A, 100B, 100C and 100D. The output of each of the IF amplifiers 110 is impressed upon a video detector, the output of which is connected to an indicator assembly, not shown, and averaging circuit 300. The output of the video detectors 120 are also impressed upon pilot signal bandpass filters 130 which have substantially the same function as the narrow bandpass filter 18 shown in Fig. 2. Cathode followers 140 are employed simply to provide a low impedance source to gain control signal generator 200.

Figure 5:
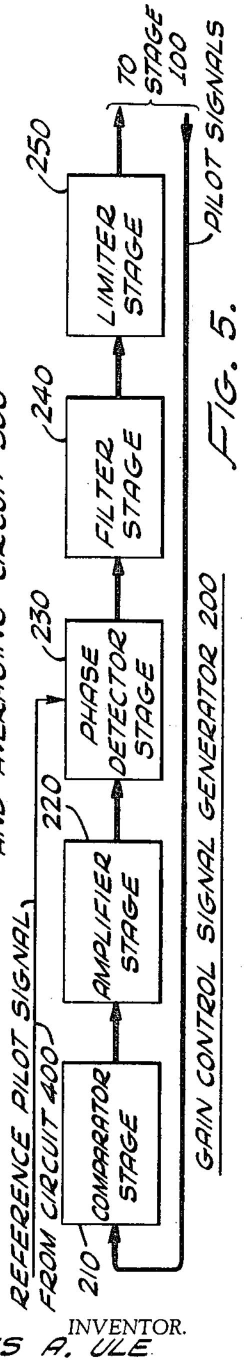

Gain control signal generator 200 itself is shown in Fig. 5. It is to be noted that this is a plural channel generator. Thus, each of the stages shown in it have four separate channels. These stages which are successively connected together, are a comparator stage 210, an amplifier stage 220, phase detector stage 230, a filter stage 240 and a limiter stage 250. The reference pilot signal from pilot signal control circuit 400 is impressed upon each of the channels in phase detector stage 230. Pilot signals from cathode followers 140 are impressed on each comparator in stage 210. The comparator stage is employed to produce error signals proportional to the difference between the amplitude of each pilot signal and a signal having an amplitude corresponding to a gain within the dynamic gain limits of each of the four channels from first mixer stage 20 to cathode followers 140 and output amplifier stage 100. In the instant case, preferably this error signal is the difference between successive pilot output signals of the different channels 100A, 100B, 100C and 100D in output amplifier stage 100. The output of comparator stage 210 is impressed upon amplifier stage 200 which has four channels to amplify each of the error signals and impress them on four phase detectors in stage 230. Each of the error signals are compared with the reference pilot signal from pilot signal control circuit 400 to develop a direct current voltage, the sign and magnitude of which represents the gain error of a particular channel from a succeeding channel or from a predetermined or average value. The outputs of the channels in stage 230 are impressed upon filter stage 240 which preferably includes four low pass filters, one for each channel. Limiter stage 250 preferably incorporates a limiter for each channel to prevent the error signals from exceeding predetermined positive and negative maximum and minimum values. The output of limiter stage 250 is then representative of the errors of each of the control signals, the error signals being impressed upon IF amplifiers 110 in output amplifier stage 100.

Figure 6:
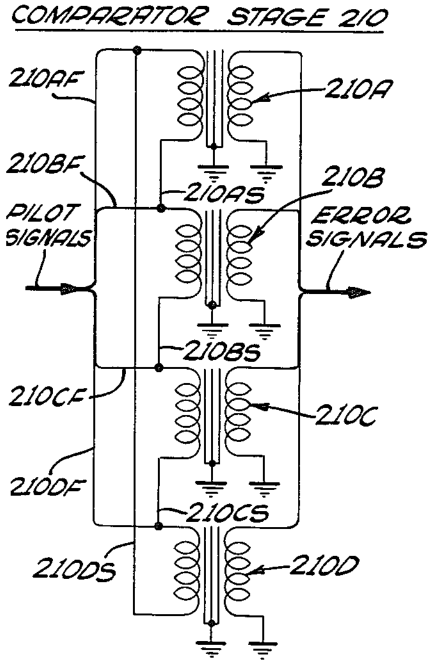
Fig. 6 is a schematic diagram of a block shown in Fig. 5.

In Fig. 6 four transformers 210A, 210B, 210C and 210D are shown representing comparator stage 210. Filtered pilot signals from output amplifier stage 10 are impressed upon first primary leads 210AF, 210BF, 210CF and 210DF. Second primary leads 210AS, 210BS, 210CS and 210DS are then connected to the first primary lead of a succeeding transformer. This is true of all except for the second primary lead 210DS of the last transformer 210D which is connected to the first primary lead 210AF of the first transformer 210A. The secondary outputs of each of the transformers 210 are then error signals which are employed to correct the gains in each of the channels they represent. The error signal at the output of transformer 210A is the difference between the pilot signals at the outputs of channels A and B. The error signal at the output of transformer 210B is the difference between the pilot signals at the outputs of channels B and C, etc.

Figure 7:
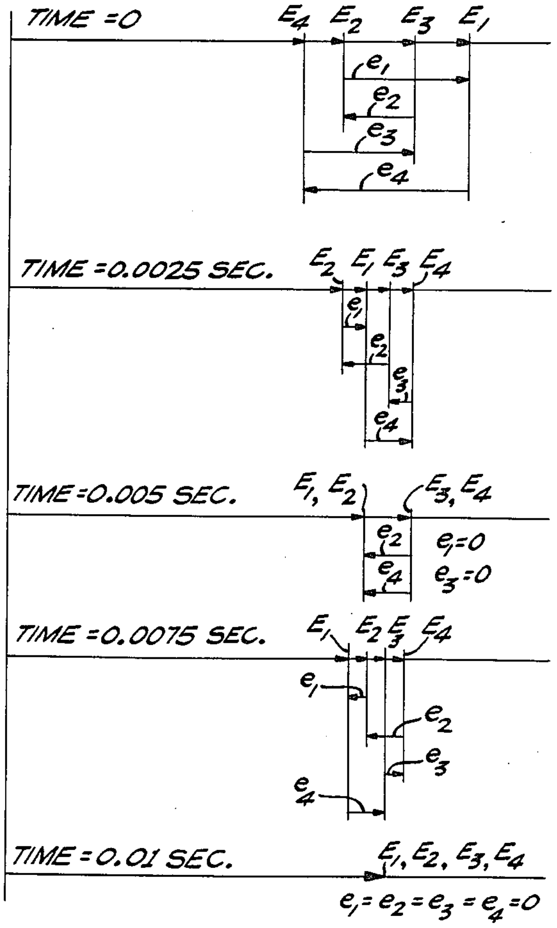

In Fig. 7 a vector diagram is shown of each of the outputs of pilot signal bandpass filters 130 in output amplifier stage 100, i.e. the amplitudes of pilot signals at the outputs of filters 130. These may be represented by vectors $E_1$, $E_2$, $E_3$ and $E_4$, respectively, for channels A, B, C and D. This means that an error signal $e_1$ will be produced to reduce the gain of IF amplifier 110A. An error signal $e_2$ will be produced to increase the gain of IF amplifier 110B. An error signal $e_3$ will be produced to reduce the gain of IF amplifier 110C. Still a fourth error signal $e_4$ will be produced to increase the gain of IF amplifier 110D. This is for the error signal at a time equal to zero. At a subsequent time, e.g. at a time 0.0025 second later, the values of $E_1$, $E_2$, $E_3$ and $E_4$ may be such as to make the values of $e_1$, $e_2$, $e_3$ and $e_4$ as shown. This may be true also for the times shown at 0.005 second, 0.0075 second and 0.01 second.

Figure 8:
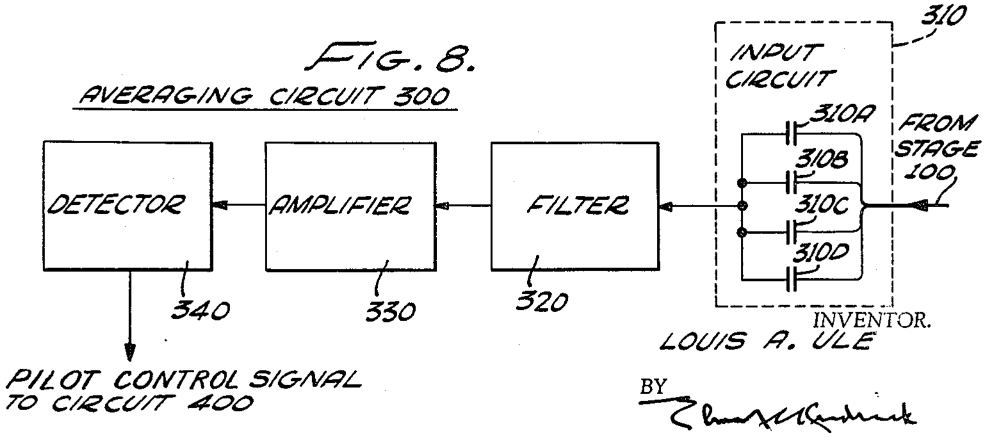
Figs. 7 and 8 are still other schematic diagrams shown in blocks in Fig. 3.

Averaging circuit 300 connected from output amplifier stage 100 is shown in Fig. 8 comprising an input circuit 310, a filter 320, an amplifier 330 and detector 340. It is to be noted that averaging circuit 300 only employs a four channel network at input circuit 310 including capacitors 310A, 310B, 310C and 310D. The input circuit 310 is in effect a summing circuit by which a detector 340 through filter and amplifier 320 and 330, respectively, develops a direct-current voltage representative of the average gains of each of the four channels in the system shown in Fig. 3. Filter 320 is employed to filter out a pilot signal of the 10,000 cycles per second frequency from the average of the output signals. Thus, the output of filter 320 is a signal having an amplitude which is the average of those of the output pilot signals and having the 10 kc. frequency.

Figure 9:
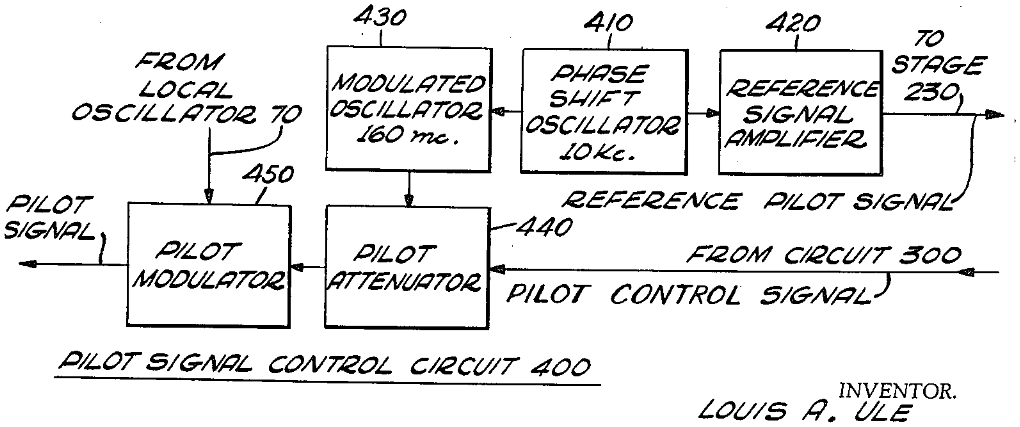
Fig. 9 is a graph of a group of vector diagrams characteristic of the operation of the gain control system shown in Fig. 3.

In Fig. 9, pilot signal control circuit 400 is shown comprising a phase shift oscillator 410 which may be, for example, a ten kilocycle oscillator to produce a reference signal through reference signal amplifier 420 which is impressed upon the channels of phase detector stage 230 in gain control signal generator 200. Phase shift oscillator 410 also impresses its output signal upon a modulated oscillator 430 which may be a 160 megacycle oscillator. The output of oscillator 430 is passed through a pilot attenuator 440 to pilot modulator 450 having an input from local oscillator 70 and an output of the modulated oscillator pilot signal modulated oscillator to first mixer stage 20. The pilot attenuator 440 passes the output of modulated oscillator 430 to pilot modulator 450. Pilot attenuator 440 attenuates the output of oscillator 430 in an amount which varies inversely with the amplitude of the pilot control signal output of averaging circuit 300. As stated previously, the output of detector 340 in averaging circuit 300 shown in Fig. 8 is, of course, a direct-current voltage and that is what is meant when the output of detector 340 or averaging circuit 300 is referred to as a "pilot-control signal."

The output signal gain control scheme aside from the operation of circuits 300 and 400 in the direction finding receiver of Fig. 3 uses a pilot signal which is generated at the receiver and which is fed to each of four channels, differenced, amplified, converted to a direct-current voltage, and applied as gain control bias to the appropriate amplifier and output amplifier stage 100.

The operation of averaging circuit 300 and pilot signal control circuit 400 cannot be explained as simply as the output signal gain control. For this reason, a somewhat more detailed summary of the operation of these circuits is given. In the first place, the pilot signal is generated by the phase shift oscillator 410 which modulates the radio frequency oscillator 430. The output of phase shift oscillator 410 is an alternating signal of a frequency of 10,000 cycles per second. This modulation envelope is fitted to the 160 megacycle output signal radio frequency oscillator 430. However, it is to be noted that the oscillation frequency of oscillator 430, that is, 160 megacycles, is the frequency falling within the intermediate frequency passband of the stages subsequent to second mixer stage 40. Pilot modulator 450 also receives an input signal from local oscillator 70. Thus, for example, the upper sideband of the output of pilot modulator 450 will have a frequency equal to that of local oscillator 70 plus the modulated 160 megacycle per second frequency of the ouput signal of oscillator 430. The modulated output of local oscillator 70 is then introduced at the front ends of each of the receiver channels even before amplification and therefore passed through second mixer stage 40 only after having been introduced into the receiving channels in the first mixing stage 20. Both the incoming signals and the output of pilot modulator 450 are then reduced in mixer stage 40 to intermediate frequency signals of 160 megacycles per second. This 160 megacycle per second intermediate frequency signal must, of course, pass through preamplifier stage 50, instantaneous automatic gain control stage 60, and IF amplifier 110A of output amplifier stage 100 shown in Fig. 4. The intermediate frequency of the IF amplifier 110A shown in output amplifier 100A, Fig. 4, is of course detected in video detector 120A. To this point, certainly the beat frequency output of mixer stage 40 combining the output of local oscillator 70 with the incoming signals as well as the output of pilot modulator 450 must fall within the passband of preamplifier stage 50, instantaneous automatic gain control stage 60, and IF amplifiers 110 of output amplifier stage 100. A 160 megacycle frequency does fall within this pass band and that is the reason this frequency was chosen for oscillator 430. From the point of the antennas 10A, 10B, 10C and 10D on in the receiver channels, the pilot signal output of modulator 450 travels through the four channels 10A, 10B, 10C and 10D of the receiver, like any normal signal received by the antennas, and they appear at the output of video detectors 120 shown in Fig. 4 simply as a 10,000 cycle per second sine waves.

Since the receiver bandwidth is several megacycles and the required gain control bandwidth at most is a few hundred cycles, it is possible to feed the pilot signal to the four channels at a power level below that of noise. The pilot signal, therefore, has little effect on external direction signals passing through the same channels. The pilot signals are each separated from noise and external signals, i.e. incoming signals, after detection by video detectors 120 by pilot signal band pass filters 130. Filter 320 passes an "average" pilot signal as explained previously. After filtering, the pilot signals themselves are differenced in the passive circuit of comparator stage 210 to produce four error voltages proportional to gain unbalance. After amplification in amplifier stage 220, the four error signals are applied to four single phase bipolar phase detectors or synchronous detectors in detector stage 230 whose alternating-reference voltage is the 10,000 cycle per second oscillator output signal applied in the proper phase by reference signal amplifier 420.

The four gain control voltages at the output of stage 230 may be super-imposed upon a manually controlled direct-current voltage which may be employed to adjust the gain of all four channels simultaneously.

Considered as a servo, the loop gain is proportional to the pilot control signal amplitude which, in turn, depends on gain control setting and several other factors. To maintain the equalizer loop gain at an optimum value, it was desired to provide automatic amplitude control for the input pilot signal. This is done by taking the average of the pilot signal output voltages in circuit 310 and filtering this average in filter 320, from the total averaged output of stage 100, amplifying the average in amplifier 330, and converting it to a direct-current voltage to provide the pilot control signal for the pilot attenuator 400 shown in the block diagram of pilot signal control circuit 400 of Fig. 9. With this arrangement, receiver gain can be varied 40 decibels with neglible change in pilot signal output. The loop gain may be adjusted simply by adjusting the pilot signal amplitude control loop gain.

It will be obvious to those skilled in the art that many other changes and modifications of the invention may be made without departing from the true scope thereof as defined in the appended claims.

What is claimed is:

1. In a system for equalizing the gain of a plurality of radiant energy receiving channels, each of said channels including an input mixer to receive an input signal and a variable gain network, the combination comprising: means for introducing a pilot signal to each of the mixers, means at the output of each channel for filtering out the pilot signal in each channel, means for developing a plurality of difference signals by subtracting the output pilot signal of each of the channels from corresponding signals having a gain within the range of all the channels, and means for controlling the gain of each of the channels substantially inversely with the amplitude of each corresponding difference signal.

2. In a system for equalizing the gains of *n* radiant energy receiving channels, all of said channels being adapted to receive corresponding intelligence signals, the combination comprising: first means for producing an input pilot signal, second means for mixing said input pilot signal with each of said input signals, third means at the output of each channel for filtering output pilot signals $e_1, e_2, e_3, \ldots e_n$ from the output of each channel, fourth means for developing difference signals proportional to $e_1-e_2$, $e_2-e_3$, $\ldots e_{n-1}-e_n$, $e_n-e_1$, fifth means for controlling the gain of each of the channels substantially inversely with the amplitude of each corresponding difference signal, and sixth means for controlling the input pilot signal amplitude substantially inversely with the average amplitude of the output pilot signals of all the channels.

3. The invention as defined in claim 2, wherein said fifth means is adapted to maintain said input pilot signal power level below that of noise accompanying each of said input signals.

4. The invention as defined in claim 2, wherein manually adjustable means are provided to control the gains of each of said channels simultaneously, and wherein the output pilot signals of said fifth means are superimposed on the gain control provided by said manually adjustable means.

5. The invention as defined in claim 2, wherein said fourth means includes a transformer for each channel, each of said transformers having first and second primary leads, the first primary lead of each of said transformers being connected from the output of separate corresponding filter means, the second primary lead of each transformer except the last being connected to the first primary lead of a succeeding transformer, the second primary lead of the last transformer being connected to the first primary lead of the first transformer, means for producing a reference pilot signal, said reference pilot signal having a substantially constant amplitude and frequency substantially equal to that of said input pilot signal, a phase detector for each and responsive to the output of each of said transformers and to said reference pilot signal for producing error signals, and a detector for each error signal for controlling the gain of each corresponding channel.

6. In a superheterodyne receiver having a local oscillator to provide a first signal and a mixer for beating said first signal with an incoming carrier to produce a second signal of a predetermined intermediate frequency, said incoming carrier having noise accompanying its reception, a system for automatic gain control, said system comprising: first means for generating a third signal of a pilot frequency lower than said predetermined intermediate frequency; second means for generating a fourth signal of a pilot frequency the same as said predetermined intermediate frequency; third means for modulating said fourth signal with said third signal to provide a fifth signal; fourth means for modulating said first signal with said fifth signal to provide a sixth signal; fifth means to introduce said sixth signal to said receiver with said incoming carrier at a level below that of said accompanying noise; mixer means to beat said first signal again against both said sixth signal and said incoming carrier; sixth means to filter said third signal from the output of said receiver; seventh means for controlling the output signal amplitude of said receiver inversely with the output signal amplitude of said sixth means; and eighth means to derive a useful output signal at the input to said sixth means.

7. In a superheterodyne receiver having a local oscillator to provide a first signal and a mixer for beating said first signal with an incoming carrier to produce a second signal of a predtermined intermediate frequency, a system for automatic gain control, said system comprising: first means for generating a third signal of a pilot frequency lower than said predetermined intermediate frequency; second means for generating a fourth signal of a pilot frequency the same as said predetermined intermediate frequency; third means for modulating said fourth signal with said third signal to provide a fifth signal; fourth means for modulating said first signal with said fifth signal to provide a sixth signal; fifth means to introduce said sixth signal to said receiver with said incoming carrier; mixer means to heat said first signal against both said sixth signal and said incoming carrier; sixth means to filter said third signal from the output of said receiver; and seventh means for controlling the output signal amplitude of said receiver inversely with the output signal amplitude of said sixth means.

8. In a system for automatic gain control, the combination comprising: an antenna system; a local oscillator for producing a first signal; a mixer for beating said first signal with an input signal to produce an output signal of a predetermined intermediate frequency; a first generator to produce a second signal of a pilot frequency lower than said predetermined intermediate frequency; a second generator to produce a third signal of a pilot frequency the same as said predetermined intermediate frequency; a first modulator to modulate said third signal with said second signal to produce a fourth signal; a second modulator to modulate said first signal with said fourth signal to produce a fifth signal; means to introduce said fifth signal to said mixer with an incoming carrier received by said antenna system; a filter responsive to the output of said mixer for separating modulation of the frequency of said first signal on said output signal; and an automatic gain control network responsive to the outputs of both said filter and said mixer for changing the output signal amplitude of said mixer inversely with the output signal amplitude of said filter.

References Cited in the file of this patent

UNITED STATES PATENTS

| | | |
|---|---|---|
| 2,477,028 | Wilkie | July 26, 1949 |
| 2,637,028 | McIlwain | Apr. 28, 1953 |

FOREIGN PATENTS

| | | |
|---|---|---|
| 528,061 | Great Britain | Oct. 22, 1940 |